April 7, 1970 C. W. LYLE 3,504,612
HIGH SPEED SHUTTER
Filed Aug. 18, 1967
Fig. 1.
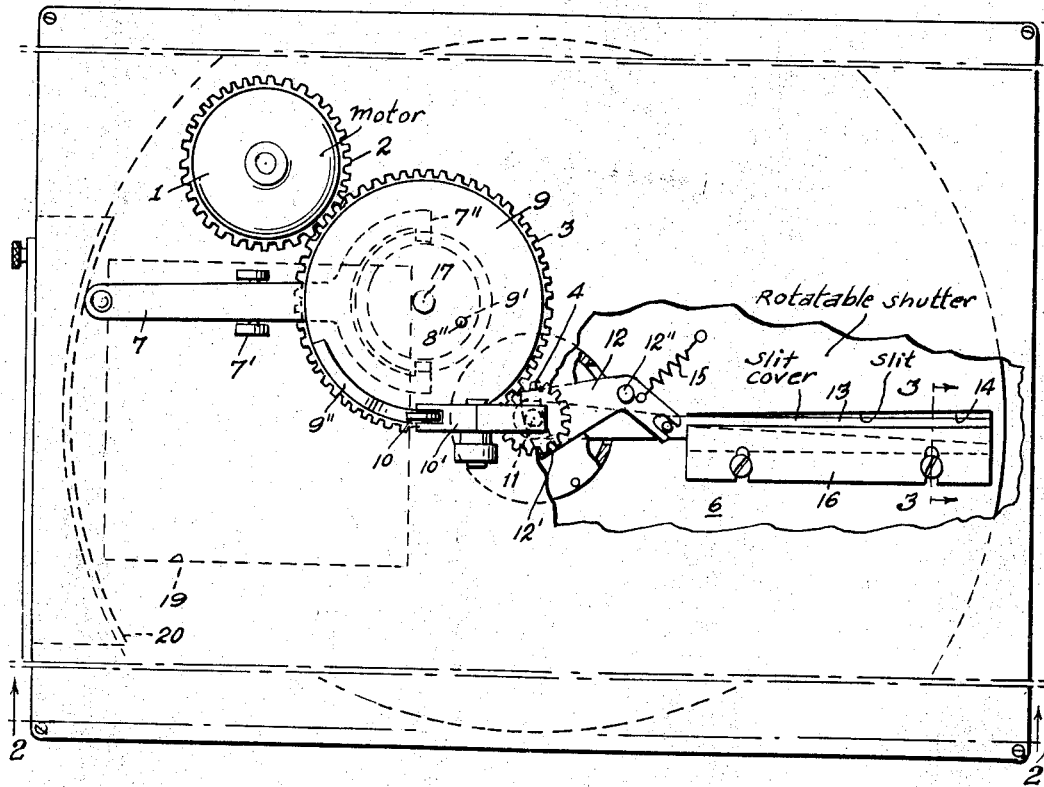
Fig. 2.
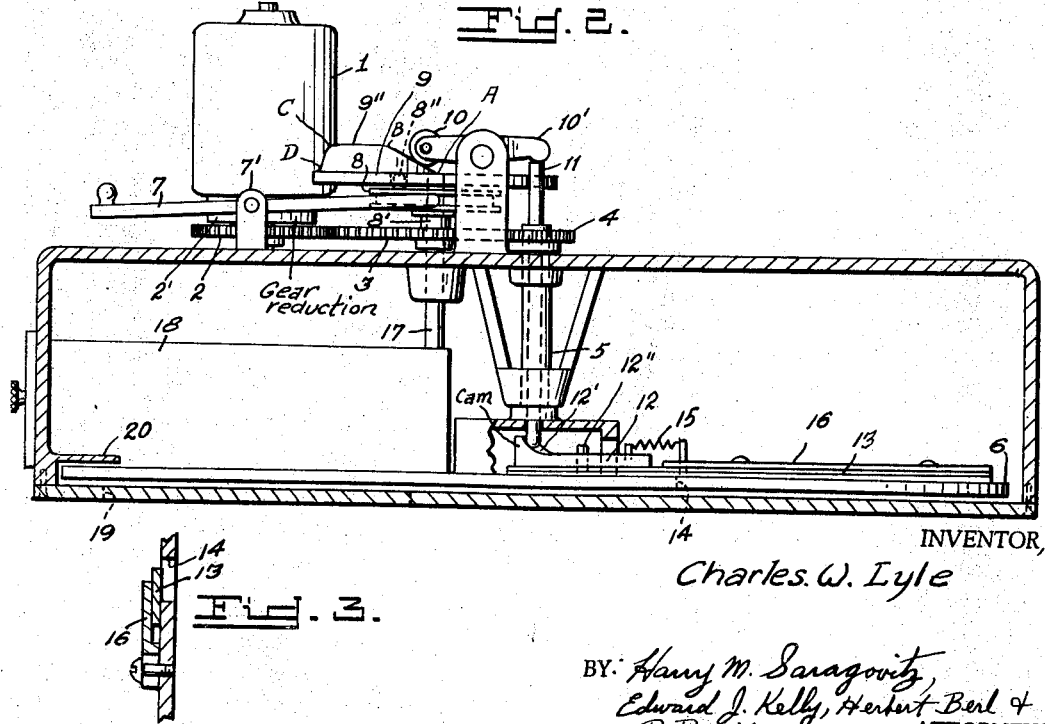
Fig. 3.
INVENTOR,
Charles. W. Lyle
BY: Harry M. Saragovitz,
Edward J. Kelly, Herbert Berl &
R. P. Gibson
ATTORNEYS.

United States Patent Office 3,504,612
Patented Apr. 7, 1970

---

3,504,612
HIGH SPEED SHUTTER
Charles W. Lyle, Havre-de-Grace, Md., assignor to the United States of America as represented by the Secretary of the Army
Filed Aug. 18, 1967, Ser. No. 661,731
Int. Cl. G03b 9/26, 29/00
U.S. Cl. 95—60                                             4 Claims

ABSTRACT OF THE DISCLOSURE

A rotary camera shutter capable of opening to expose a large area of film at high speeds. The shutter and the film advance are connected to the motor by reduction gears. The driving gears of the shutter and film advance are chosen so that the shutter will make more than one revolution for each cycle of the driving gear and the film advance.

---

The invention described herein may be manufactured and used by or for the Government of the United States of America for governmental purposes without the payment to me of any royalty thereon.

It is an object of this invention to provide high speed shutter apparatus of the rotary type with a slit which may be opened to quickly expose a large area of film through an opening and then keep the opening closed as the rotary shutter revolves and the film is advanced.

Further objects will become evident as the description proceeds.

In the drawing:

FIG. 1 is a schematic plan view of the invention with parts broken away;

FIG. 2 is a side elevation along line 2—2 of FIG. 1 with parts broken away;

FIG. 3 is a cross section along line 3—3 of FIG. 1.

A well-known way of exposing a large film or film plate in a camera is to pass a piece of opaque material with a slit in it across the opening to admit light to the film. A spring-loaded roller similar to that of a window shade pulls the material and slit across the opening. In order to take another picture the spring must be rewound. The opening must be covered while the material and slit are being rewound.

Many motion-picture cameras use a continuously revolving shutter with a slit in it. A new area of film must be advanced into the film aperture and stopped between successive crossings of the slit to avoid multiple exposures or blurring.

Typical exposure and film advance mechanisms are inadequate when large, heavy film is to be exposed rapidly, moved and stopped quickly (e.g. film area 11 by 11 inches with exposure time of $\frac{1}{500}$ to $\frac{1}{3000}$ second at a rate of one picture per second). To use a focal plane shutter just ahead of an 11 by 11 inch film plane the circular revolving shutter must be of the order of three feet in diameter. Such a massive shutter cannot be started, brought up to high speed, and stopped instantly. Nevertheless, the slit must move across the film area very rapidly to avoid changing of the scene in one area of the picture before or after exposure of another area. If the slit moves slowly, to expose a rapidly changing scene such as a missile homing in on an airplane, the objects will be recorded at different points in time and will appear closer together or farther apart than they actually are. The present invention solves the difficult problems pointed out above.

Motor 1 drives speed reduction unit 2′ and gears 2, 3 and 4. Gear 4 drives hollow shutter shaft 5 and shutter 6. Operating lever 7 is pivotally mounted at 7′ and bifurcated at 7″ to raise and lower grooved wheel 8. Gear 3 and wheel 8 are mounted on sleeve 8′ and rotate freely on shaft 17. Wheel 8 is connected to sleeve 8′ through a spline allowing wheel 8 to be moved vertically while still being driven by gear 3. Wheel 8 carries a pin 8″ which engages recess 9′ in cam wheel 9 when in its raised position to drive wheel 9, cam 9″ and shaft 17. Cam 9″ operates cam follower 10 to rock arm 10′ and depress plunger 11. Plunger 11 acts against cam 12′ to pivot cam lever 12 about pivot 12″. Lever 12 moves slit cover 13 to uncover slit 14. The slit cover is returned by spring 15. Slit cover guide 16 is adjustable to change the effective opening width of slit 14. Shaft 17 drives film advance mechanism in film magazine 18 to draw the film across light aperture 19 for exposure. Light trap 20 prevents entrance of stray light rays which would fog the film.

OPERATION

Any whole-number ratio may be used but assume for illustration that the ratio between gears 3 and 4 is four to one. In FIG. 2 operation of lever 7 causes pin 8″ to connect cam wheel 9 to revolving gear 3. This starts rotation of film advance shaft 17 and starts movement of cam 9″. The film is advanced for a new exposure at which time apparatus (not shown) in box 18 stops movement of the film. At this moment cam 9″ approaches the position illustrated in FIG. 2. In the position shown the cam surface at A has just started to cause the cam follower 10 to start opening the slit cover. At point B on the cam the slit will be fully open and remain so until point C reaches the follower at which time the slit cover will start to close. At point D the slit will be closed and remain so until point A again engages the cam follower to repeat the cycle.

Because the distance A to D occupies about one-fourth of the circumference of cam wheel 9, and gear 4 and shutter 6 turn four revolutions while cam wheel 9 turns one revolution, it is evident that the opening and closing of the slit occurs while the shutter makes only one revolution. During the other three-fourths of the cam wheel cycle the shutter makes three more revolutions with the slit covered. It is during these three revolutions that the film advancing mechanism moves the film for another exposure. When the flat spot on the cam between B and C engages follower 10 the shutter is fully open and slit 14 is passing across the aperture 19.

This invention allows a shutter, particularly a large, heavy shutter, to be accelerated to the desired speed without exposing the film. After the desired shutter speed has been reached an operator can, at any time he chooses, expose the film by causing lever 7 to be depressed to uncover slit 14 during a part of a revolution of shutter 6. The mechanism described allows a series of pictures to be taken, the film being transported while the slit is covered during several revolutions of the shutter. However the control of the slit cover can be arranged so that single or multiple exposures may be made on the same or different film areas whenever and at whatever intervals the operator may choose.

This invention may be used in almost any case in which a beam of light is to be interrupted and is particularly useful in the high speed exposure of large film areas as described above.

I claim:

1. High speed shutter apparatus comprising a rotatable opaque shutter, a slit in said shutter to pass light to photographic film, movable cover means normally covering said slit, shutter rotating means for continuously rotating said shutter film advance and movable cover operating means, and interconnecting means between said film advance and movable cover operating means requiring more than one revolution of said shutter for each cycle of operation of said film advance and movable cover operating means.

2. Apparatus as in claim 1 wherein said interconnecting means comprises a first cam, disengageable means to selectively drive said first cam, a cam-follower and rocker arm operated by said first cam, a plunger operated by said rocker arm, and a second cam operated by said plunger to operate said movable cover means.

3. Apparatus as in claim 2 wherein said first cam is connected to a cam wheel and said cam wheel is connected to said film advance means, whereby said disengageable means drives said cam wheel, film advance means and movable cover means.

4. Apparatus as in claim 3 wherein said disengageable means comprises a slidable wheel and positive connection means driven by and synchronized with said shutter rotating means, said slidable wheel and positive connection means engaging said cam wheel when shifted to a first position and disengaging said cam wheel when shifted to a second position.

References Cited

UNITED STATES PATENTS

| | | | |
|---|---|---|---|
| 1,402,486 | 1/1922 | Folmer | 95—60 |
| 2,347,699 | 5/1944 | Magnus | 95—60 XR |
| 2,474,323 | 6/1949 | Rattray | 95—60 XR |
| 3,303,271 | 2/1967 | Hecker | 95—61 XR |

NORTON ANSHER, Primary Examiner

LEO H. McCORMICK, JR., Assistant Examiner

U.S. Cl. X.R.

95—12.5; 352—208